L. M. WILLIAMS.
COOK STOVE.
APPLICATION FILED JULY 11, 1919.

Patented Dec. 2, 1919.

Inventor
Lewis M. Williams

Attorney

UNITED STATES PATENT OFFICE.

LEWIS M. WILLIAMS, OF FORT WAYNE, INDIANA.

COOK-STOVE.

1,323,562.  Specification of Letters Patent.  Patented Dec. 2, 1919.

Application filed July 11, 1919. Serial No. 310,140.

*To all whom it may concern:*

Be it known that I, LEWIS M. WILLIAMS, a citizen of the United States, residing at Fort Wayne, in the county of Allen and State of Indiana, have invented certain new and useful Improvements in Cook-Stoves, of which the following is a specification.

This invention relates to cook stoves, and more particularly to portable ovens.

The object of the invention is to provide a cooking stove or a portable oven so constructed that all of the heat units from a single burner or source of heat may be utilized by this device.

Another object of the invention is to provide a device of this character so constructed that the heat passing upward will converge toward the center and thus be centered on and pass around the vessel containing the food to be cooked.

Another object is to construct a device of this character so that several dishes may be heated at the same time by a single heating unit.

Another object is to form an oven or stove of this character which will occupy a minimum amount of floor space while furnishing a maximum amount of vessel supporting space.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

The device constituting this invention comprises a casing 1 which may be of any desired cross sectional contour, being here shown in the form of a cylinder with a closed bottom and open top, although obviously this arrangement may be reversed.

Figure 1:
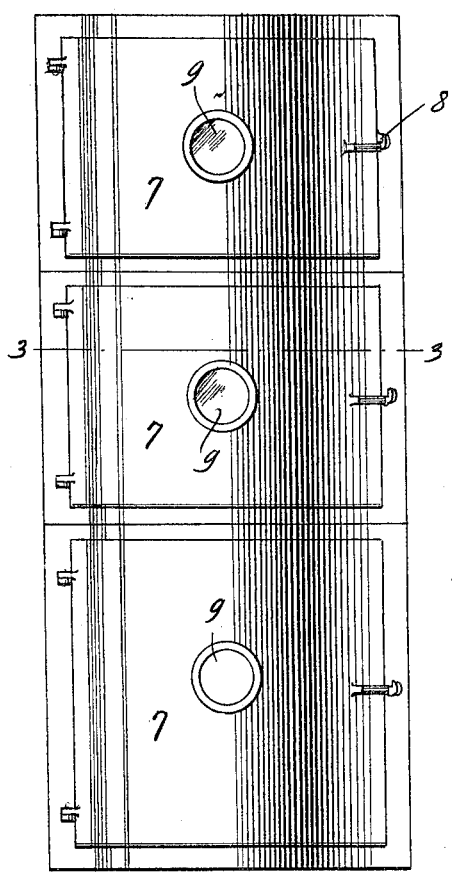
Figure 1 represents a front elevation of an oven embodying this invention.
Figure 2:
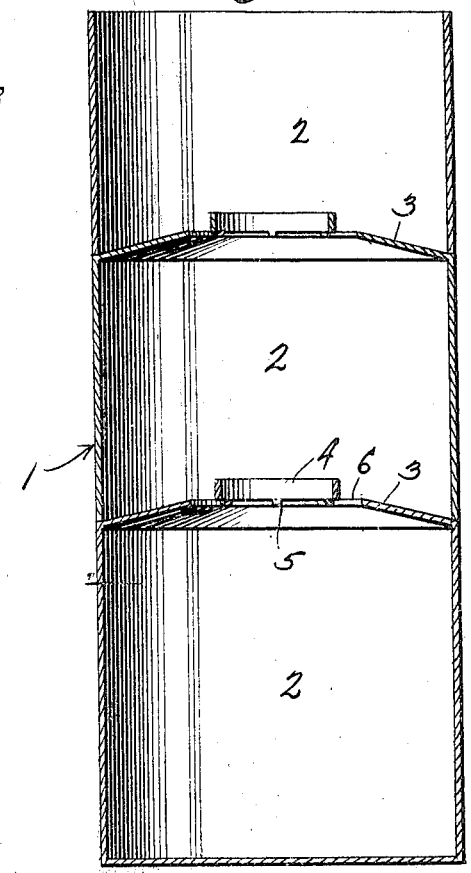
Fig. 2 is a transverse vertical section thereof.
Figure 3:
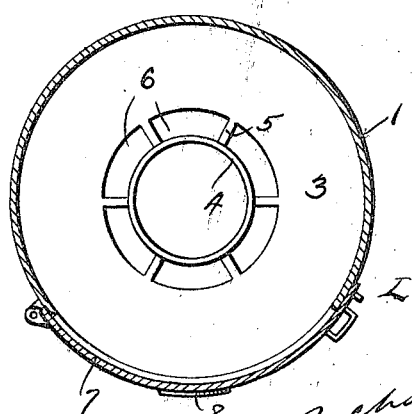
Fig. 3 is a horizontal section taken on the line 3—3 of Fig. 1.

This casing 1 is divided into a plurality of vertically disposed compartments 2, three being here shown, although obviously any desired number may be employed. These compartments 2 are separated by partitions 3 having central openings and converging upwardly toward said openings. Collars 4 are arranged around these openings and connected by radial arms 5 with the body of the partition providing heat passages 6 between said collars and the partitions proper as is shown clearly in Fig. 3. These collars 4 are designed to form seats for vessels containing food to be cooked and the upward convergence of the partitions causes the heat passing upward to be centered around the vessel supported on the collar 4 and to pass upward through the passages 6 of the compartments above.

Each compartment 2 is provided with a door 7 which is here shown hinged at one side of the door opening and secured by a latch 8 at the other side. Each of these doors 7 is here shown provided with a sight opening 9 to provide inspection of the interior of the compartment and which is covered by any suitable transparent material.

From the above description it will be obvious that this stove may be readily transported from place to place and used in connection with any type of heating element including electricity, gas, hydrocarbons, alcohol or solid fuel, and it may be so placed over the heater that all of the heat will be conserved and utilized within the oven.

From the foregoing description, taken in connection with the accompanying drawings, the advantages of the construction and of the method of operation will be readily apparent to those skilled in the art to which the invention appertains.

Having thus fully described my invention, what I claim as new and desire to secure by Letters Patent, is:—

1. A device of the class described comprising a casing having a horizontal partition intermediately of its ends with a central opening therein, a vessel support in the form of an upstanding collar arranged in said opening and spaced from the edge wall thereof, radiating arms connecting the lower end of said collar with said edge and providing heat passages between the partition and collar, said casing having a door for affording access to the interior thereof.

2. A stove of the class described comprising a casing provided with a plurality of vertically spaced partitions arranged one above the other and having alined openings therein, collars arranged in said openings and extending above said partitions, radial arms connecting said collars with said partitions to form heat passages around the collars, and doors arranged to afford access to each of said compartments.

In testimony whereof I affix my signature in presence of two witnesses.

LEWIS M. WILLIAMS.

Witnesses:
  JOHN S. MOENING,
  ALTON H. PERKINS.